(12) United States Patent
Petillon (10) Patent No.: US 11,022,462 B2
(45) Date of Patent: Jun. 1, 2021

(54) SYSTEM AND A METHOD OF ANALYZING AND MONITORING INTERFERING MOVEMENTS OF AN INERTIAL UNIT DURING A STAGE OF STATIC ALIGNMENT

(71) Applicant: AIRBUS HELICOPTERS, Marignane (FR)

(72) Inventor: Jean Paul Petillon, Miramas (FR)

(73) Assignee: AIRBUS HELICOPTERS, Marignane (FR)

( * ) Notice: Subject to any disclaimer, the term of this patent is extended or adjusted under 35 U.S.C. 154(b) by 423 days.

(21) Appl. No.: 15/945,525

(22) Filed: Apr. 4, 2018

(65) Prior Publication Data

US 2018/0292232 A1    Oct. 11, 2018

(30) Foreign Application Priority Data

Apr. 7, 2017 (FR) ...................................... 1770355

(51) Int. Cl.
  *G01C 21/16* (2006.01)
  *G01C 25/00* (2006.01)
  *G07C 5/00* (2006.01)

(52) U.S. Cl.
  CPC ........... *G01C 25/005* (2013.01); *G01C 21/16* (2013.01); *G07C 5/008* (2013.01)

(58) Field of Classification Search
  CPC ...... G01C 21/16; G01C 19/38; G01C 25/005; G01C 21/10; G07C 5/008
  See application file for complete search history.

(56) References Cited

U.S. PATENT DOCUMENTS

| 4,032,759 A * | 6/1977 | Danik ................... G01C 25/005 701/493 |
| 5,150,856 A * | 9/1992 | Gaide ..................... F41G 7/007 244/3.1 |
| 2006/0047427 A1 | 3/2006 | Weed et al. |

(Continued)

FOREIGN PATENT DOCUMENTS

| EP | 2488829 A1 | 8/2012 |
| FR | 2940427 A1 | 6/2010 |

(Continued)

OTHER PUBLICATIONS

French Search Report for French Application No. FR1770355, Completed by the French Patent Office, dated Dec. 15, 2017, 8 pages.

(Continued)

*Primary Examiner* — Mischita L Henson
(74) *Attorney, Agent, or Firm* — Brooks Kushman P.C.

(57) ABSTRACT

A system and to a method of analyzing and monitoring interfering movements of an inertial unit of an aircraft during a stage of statically aligning the inertial unit. During the static alignment stage, measurements of the velocity of the aircraft relative to the ground are acquired, and states of a mirror process having a model that is close to the model of the process of aligning the inertial unit are estimated. The states of the mirror process are estimated from observations constituted by the measurements of velocity relative to the ground. Finally, the estimates of the states are compared with respective validation thresholds in order to validate or not validate said alignment of the inertial unit.

19 Claims, 2 Drawing Sheets

(56) References Cited

U.S. PATENT DOCUMENTS

2007/0282528 A1* 12/2007 Morgan ............... G01C 21/165
  701/510
2010/0161223 A1   6/2010 Becheret

FOREIGN PATENT DOCUMENTS

FR         2951935 A1   5/2011
WO    2011045032 A1   4/2011

OTHER PUBLICATIONS

Salvatore Gaglione, How does a GNSS receiver estimate velocity, magazine Inside GNSS, col. GNSS Solutions, Mar.-Apr. 2015, 4 pages.

* cited by examiner

SYSTEM AND A METHOD OF ANALYZING AND MONITORING INTERFERING MOVEMENTS OF AN INERTIAL UNIT DURING A STAGE OF STATIC ALIGNMENT

CROSS-REFERENCE TO RELATED APPLICATIONS

This application claims priority to French patent application No. FR 1770355 filed on Apr. 7, 2017, the disclosure of which is incorporated in its entirety by reference herein.

BACKGROUND OF THE INVENTION

(1) Field of the Invention

The general field of the present invention is that of sensor systems for aircraft, and in particular inertial units.

The present invention relates to a system and to a method of analyzing and monitoring interfering movements of an inertial unit during a stage of static alignment of the inertial unit.

More precisely, the present invention makes it possible to estimate orientation errors and velocity errors affecting the measurements of the inertial unit as a result of movements during its static initialization stage during which:

the inertial unit aligns its axes on geographical axes; and
the inertial unit zeros its velocity estimate.

(2) Description of Related Art

An inertial unit is an instrument that is used in particular in the field of aviation, but that can be installed on board any type of vehicle, specifically a ship, a submarine, an aircraft, a missile, or indeed a spacecraft. An inertial unit is capable of integrating the movements to which it is subjected, and in particular accelerations and angular velocities, in order to provide estimates of the orientation, of the linear velocity, and also of the position of the vehicle. By way of example, the orientation of a vehicle may be defined by roll, pitching, and heading angles.

An inertial unit generally has six sensors, namely three gyros for measuring angular velocities about three axes, and three accelerometers arranged to measure accelerations along those three axes. An inertial unit has no need for any external information. An inertial unit makes use exclusively of measurements supplied by its specific internal sensors for sensing angular velocities and forces in order to estimate its orientation, its velocity, and its position by integrating the measurements from its internal sensors over time.

Because of the time integration process that is used, it is essential to perform a stage of initializing the inertial unit whenever it is started. The initialization stage is generally performed when the vehicle that uses the inertial unit is stationary, typically prior to takeoff of an aircraft.

An initialization stage comprises in particular an alignment stage during which the following are estimated:

a vertical direction from the measurements of the accelerometers that serve to determine the direction of terrestrial gravity, and thus of the vertical;

a geographical North direction using measurements of the gyros that detect the terrestrial rotation vector and thus, by projecting this vector onto the horizontal plane, the North direction; and a velocity vector relative to the ground.

Usually, an initial position is not estimated by the inertial unit. On the contrary, it needs to be input, e.g. by the crew.

An alignment process that is typically used in an inertial unit seeks to cause certain values to converge on zero, the values being firstly of two angles of inclination of a virtual platform as calculated by the inertial unit, and secondly an angle of misalignment about the vertical direction of the virtual platform. This alignment process typically makes use of a Kalman filter.

Certain alignment processes are based on the assumption that the vehicle is stationary and they therefore also seek to set to zero the two horizontal components of the velocity of the vehicle relative to the ground. This is referred to as "static" alignment. Below in this document, consideration is given only to the static alignment situation. Thus, in order to lighten the text, the adjective "static" is often omitted, however on each occurrence of the term "alignment", it should be understood as "static alignment".

However, while the alignment process is taking place, the aircraft might be subjected to interfering movements, such as being towed by a tractor vehicle. The assumption that the vehicle is stationary is then wrong. This gives rise to poor accuracy of the inertial unit. The inaccuracies that result from interfering movements during alignment can reach values that are sufficient to subsequently compromise the safety of the flight during a subsequent stage of navigation while flying. In order to avoid polluting the inertial unit, various protective measures are known.

In order to monitor whether the aircraft is indeed stationary during the stage of aligning its inertial unit, it is known by way of example to analyze the amplitude of the residue of the Kalman estimator that is performing the alignment.

That type of monitoring by means of the alignment process of an inertial unit is satisfactory for detecting interfering movements of relatively high frequency, e.g. caused by the aircraft being towed.

Document EP 2 488 829 describes a method of that type. That document describes a method of detecting interfering movements based on comparing a residual signal with a predefined threshold, the residual signal being the residue between a raw position signal obtained by integrating signals from the sensors of an inertial unit and a theoretical signal modeling the raw position signal as a function of a predetermined model for error in the absence of movement. According to that document, movements of large amplitude, whether of short or long duration, can be detected by comparing acceleration measurements with thresholds, whereas movements of small amplitude and short duration can be detected from the parameters of a Kalman filter.

Also known is Document FR 2 940 427 which describes the use of an inertial unit for determining a heading using two different modes: namely a "North-seeking" mode, with the inertial unit being fixed relative to the ground and horizontal, and a free gyro mode with the inertial unit then being stationary relative to the ground. A difference between the headings obtained using those two modes is determined, and as a function of that difference, the heading that is obtained by using one or the other of the modes is retained for use.

Finally, Document US 2006/047427 describes a system and a method for aligning an inertial unit that can be used even when the aircraft to which it is fitted is moving. That system has an inertial unit supplying purely inertial navigation information, and an external source, such as a global navigation satellite system (GNSS) receiver, that is independent from the inertial unit and that also supplies navigation information. The system has navigation logic receiving the navigation information and provided with recursive filters in order to process the navigation information, and also logic for verifying integrity in order to monitor, compare, and combine those two sources of navigation information. In particular, errors between those two sources of navigation information can be defined and compared with predetermined thresholds in order to define what navigation information supplied by the inertial unit and/or the external source can be used for navigation purposes.

Nevertheless, such alignment processes present the drawback of not being effective for detecting certain specific interfering movements, in particular slow movements having a period that coincides with the duration of the entire alignment stage.

This problem applies particularly to a rotary wing aircraft taking off from an oil platform at sea and potentially being subjected thereon to movements that are very slow through an amplitude of several meters, e.g. due to the system for stabilizing the position of the oil platform.

It can thus be seen that inertial units and the static alignment processes they implement include devices for detecting interfering movements during the alignment stage. However, those detection devices are not capable of exhaustively detecting all types of interfering movements that might disturb the alignment stage, and consequently they give rise to dangerous errors in the data supplied by the inertial unit during a subsequent stage of navigation in flight.

BRIEF SUMMARY OF THE INVENTION

An object of the present invention is thus to be unaffected by the above-mentioned limitations so as to be able to detect any type of interfering movements to which an inertial unit might be subjected and that could disturb the static alignment stage. Thereafter, the present invention can inhibit validating the static alignment stage in order to avoid the inertial unit supplying data that is erroneous. Alternatively, after detecting interfering movements and making a quantified estimate of their effects on the inertial unit, the present invention can correct the erroneous data supplied by the inertial unit in order to make that data usable, i.e. sufficiently accurate.

In this context, the present invention provides a method of analyzing and monitoring interfering movements of an inertial unit of an aircraft during a stage of statically aligning the inertial unit.

The method of the invention is remarkable in that during the stage of statically aligning the inertial unit, the method performs the following two steps:

an acquisition step for acquiring measurements of the movement of the aircraft relative to the ground; and an estimation step for estimating states of a mirror process having a model close to the model of the process of aligning the inertial unit, the states of the mirror process being estimated from observations constituted by the movement measurements.

This method is intended more particularly for use on board an aircraft, however it may be applied to any vehicle that uses an inertial unit.

In order to apply the method, the aircraft has at least one inertial unit, together with a movement sensor making it possible to measure the movements of the aircraft relative to the ground, and an estimator for estimating a mirror process of structure close to the structure of the process of aligning the inertial unit. This estimator for estimating a mirror process close to the process of aligning the inertial unit is configured to perform the method of analyzing and monitoring interfering movements of an inertial unit during an alignment stage.

In this context, when a process or a process model is said to be "close to" process models or processes that are nearly identical, that means a model of a mirror process may in particular be simplified or else approximated, or indeed both simplified and approximated relative to the model of the alignment process. For example, the model of a mirror process is defined by a set of simplified differential equations, of a degree that is lower than or equal to the number of states of the model of the alignment process.

By way of example, the movement sensor is a velocity sensor supplying measurements of a velocity $\vec{v}_g$ of the aircraft relative to the ground. The movement sensor may equally well be a position sensor providing measurements of the position $\vec{x}_g$ of the aircraft relative to the ground. In both situations, the movement sensor may be a GNSS receiver or a Doppler effect radar, for example.

As mentioned above, and by way of example, a process of aligning an inertial unit may be based on a model having one or more states, in particular states representing orientation and velocity errors, with variation thereof being governed by one or more differential equations that, on being solved during the alignment stage, make it possible to cause the estimated states of the model to converge towards zero values. The alignment process can thus be in the form of an estimator for estimating orientation and velocity errors.

The estimator for estimating orientation and velocity errors is generally associated with a process for detecting interfering movements, which process is typically based on analyzing residues.

In spite of the devices for detecting interfering movements installed in the inertial unit, possibly integrated in the alignment process, some interfering movements of the inertial unit remain undetectable while nevertheless giving rise to disturbances. Under such circumstances, the alignment of an inertial unit in the prior art might be considered as being valid even though the data then being supplied by the inertial unit is severely erroneous and contains orientation and velocity errors exceeding the acceptable maximum.

Interfering movements that are undetectable independently by the process for detecting interfering movements of the inertial unit are movements that vary in a manner that is identical or close to variation in the state of the generator process as constituted by the differential equation solver of the model of the process for aligning the inertial unit.

Specifically, when such movements match the variation in those states, the differences between the characteristics of the movements and the states as estimated by the alignment process are constantly substantially zero. Consequently, the alignment process behaves as though the aircraft were stationary in spite of the presence of those movements.

Under such circumstances, any movement of the inertial unit having a time function that can be generated by the differential equation solver of the alignment process, and regardless of its amplitude, cannot be distinguished from being stationary by the inertial sensors on their own, and gives rise to inertial estimates of orientation and velocity that are erroneous at the end of aligning the inertial unit, and that consequently continue to be erroneous throughout the stage of navigation that follows the stage of alignment. The amplitude of such errors is unbounded.

In order to remedy that problem, the method of the invention advantageously makes use of a mirror process having a model that is close to the model for error propagation in the process of aligning the inertial unit. The method of the invention then makes it possible to estimate states of the mirror process from observations constituted by the movement measurements. These estimates of states constitute estimates of orientation and velocity errors affecting the data supplied by the inertial unit at the end of the alignment stage.

The model of this mirror process is preferably identical to the model of the process of aligning the inertial unit. The differential equations of governing variation in the state of the model of the mirror process and of the model of the alignment process are then the same, and in particular both models have the same number of states.

Nevertheless, it is also possible to simplify the mirror process compared with the alignment process without going beyond the ambit of the invention. In particular, certain states of the alignment process may have very little impact on the overall behavior of the model and can therefore be ignored and need not be incorporated in the mirror process.

For example, when the movement measurements are measurements of the velocity $\vec{v}_g$ of the aircraft relative to the ground, the mirror process typically has five states, namely three error angles for the orientation of the virtual platform of the inertial unit relative to the geographical axes, and two horizontal components of velocity relative to ground. The two outputs of the mirror process are estimates of these horizontal components of velocity relative to the ground.

In a particular implementation of the invention, the mirror process is used in an open loop. These two outputs of the mirror process then vary in compliance with polynomial functions of time, firstly a second degree polynomial function for the North/South component of the velocity, and secondly a first degree polynomial function for the East/West component of the velocity. In this particular implementation, the estimation by the mirror process consists in calculating:

i) a parabola corresponding to the second degree polynomial function that is the closest to the North/South components of the measurements of velocity relative to the ground; and ii) a straight line, corresponding to the first degree polynomial function that is the closest to the East/West components of the measurements of the velocity relative to the ground.

This calculation of the closest polynomial functions may be performed by the least squares method, which may be recursive or non-recursive.

In another implementation of the invention, and by way of example, the states the mirror process may be estimated by Kalman filtering in which the states are those of the mirror process and for which the observations are the measurements of movement relative to the ground.

When using the non-recursive least squares method, measurements of the movement of the aircraft estimates are acquired and states of the mirror process are estimated sequentially. When using the recursive least squares methods or a Kalman filter, the measurements of the movement of the aircraft are acquired and the states of the mirror process are estimated simultaneously.

Furthermore, in variants, the method of the invention may include an additional step.

Thus, in a first variant, the additional step of the method is advantageously comparing the absolute value of at least one estimate of one of the states with at least one validation threshold in order to validate or not validate the alignment of the inertial unit.

For example, in this first variant, thresholds are defined for validating the alignment. These validation thresholds are generally defined during a stage of developing the system and the method of analyzing and monitoring of the invention. The values of these validation thresholds are selected as a function of the accuracy expected from the inertial unit. Each validation threshold corresponds to a respective one of the estimated states, these estimated states corresponding respectively to orientation and velocity errors due to the interfering movements during the alignment stage and affecting the data supplied by the inertial unit after the alignment stage.

As a result, during the comparison, the absolute value of at least one estimate of the state is compared with the corresponding validation threshold, and an "alignment invalid" signal is activated whenever the absolute value of an estimate of a state is greater than the corresponding validation threshold. The method may advantageously make it possible to limit the comparison to estimates of states having the greatest influence on the performance of the inertial unit.

Preferably, the individual absolute values of the estimates of the states are compared with respective corresponding validation thresholds in order to verify the quality of the alignment of the inertial unit.

In another example of this first variant, during the comparison, at least two estimates of the states are combined in order to form an estimated state combination, and an "alignment invalid" signal is activated when the estimated state combination is greater than or equal to a global threshold. The global value is a predetermined constant corresponding to a maximum acceptable error value and it is selected as a function of the accuracy expected from the inertial unit.

Such a estimated state combination makes it possible in particular to give preference to monitoring certain states by giving more weight to an estimate of one state than to an estimate of another state. By way of example, the estimated state may be combined as a weighted sum of the squares of at least two state estimates.

In a second variant of the method of the invention, the method may use state estimates not for the purpose of validating or not validating the alignment, but for correcting the data supplied by the inertial unit so that, after correction, the data complies with the accuracy expected from the inertial unit, and as a result can be used by the systems of the aircraft in which the inertial unit is installed.

Under such circumstances, the additional step of the method in this second variant advantageously consists in correcting the data supplied by the inertial unit so as to make the inertial data usable, with this correction being calculated on the basis of the states estimated by the mirror process. For example, each estimate of a state of the mirror process is used as an initial value for a process of estimating errors of the inertial unit during navigation. This process of estimating errors of the inertial unit during navigation is then continued throughout the entire duration of the stage of navigation of the inertial unit following the alignment stage. Finally, the error estimates as maintained in this way are subtracted from the data supplied by the inertial unit.

Furthermore, in order to obtain a good estimate of the parameters of the interfering movements of the inertial unit and in order to deduce the resulting errors of the inertial unit accurately, the method of the invention preferably makes use of movement measurements that are themselves accurate. By way of example, these movement measurements are advantageously supplied by a GNSS receiver making use of the phase increments of the carrier waves of the signals transited by the satellites. Specifically, the resulting measurement noise, in particular concerning velocity measurements, is much smaller than the noise of methods conventionally used, such as those based on the derivative of position or on observing the Doppler effect on said carriers. An implementation of this technique is described by way of example in the magazine "Inside GNSS", in the "GNSS solutions" column, March-April 2015, under the title "How does a GNSS receiver estimate velocity?"

For velocity measurements, the accuracy that results from the carrier phase increment technique is of the order of a few millimeters per second while making use solely of the signals from the satellites. For position measurements, accuracy may be of the order of a few millimeters, but obtaining such accuracy requires not only signals from satellites, but also a stationary ground station communicating with the aircraft.

As a result, the method of the invention enables a central unit that is being monitored by the movement sensor to be aligned. The movement measurements supplied by the movement sensor are specifically not mixed or combined with the data delivered by the inertial unit.

Consequently, if the movement sensor provides measurements that are corrupted, that gives rise to a false alarm being issued corresponding to a "moved alignment", but under no circumstances is the data supplied by the inertial unit corrupted by those movement measurements.

The present invention also provides a system for analyzing and monitoring interfering movements of an inertial unit of an aircraft during an alignment stage. Such a system for analyzing and monitoring interfering movements of an inertial unit during an alignment stage comprise a movement sensor for sensing movement of the aircraft and supplying measurements of movement of the aircraft relative to the ground, together with an estimator for estimating a mirror process of structure close to the structure of the alignment process of the inertial unit. The estimator has at least one calculator or processor and at least one memory storing in particular calculation instructions and optionally thresholds for validating the alignment of the inertial unit.

The estimator is configured to perform the above-mentioned method so as to estimate states of the mirror process from observations constituted by movement measurements supplied by the movement sensor.

BRIEF DESCRIPTION OF THE DRAWINGS

The invention and its advantages appear in greater detail from the context of the following description of implementations given by way of illustration and with reference to the accompanying figures, in which.

Elements present in more than one of the figures are given the same references in each of them.

DETAILED DESCRIPTION OF THE INVENTION

Figure 1:
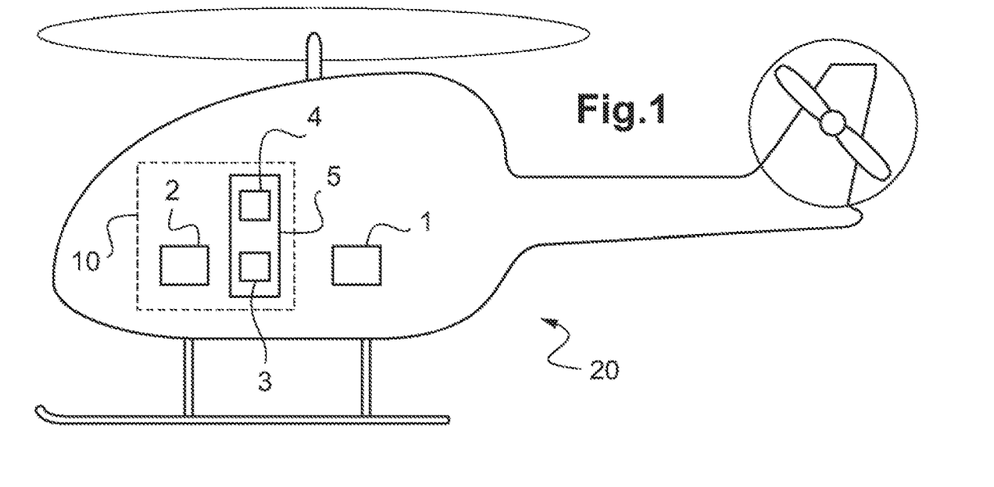
FIG. 1 shows an aircraft having a system for analyzing and monitoring interfering movements of an inertial unit.

FIG. 1 shows a rotary wing aircraft 20. The aircraft 20 has an inertial unit 1 and a system 10 for analyzing and monitoring interfering movements of the inertial unit 1 during a stage of aligning the inertial unit 1. The system 10 is shown in detail in FIG. 2 and it includes a movement sensor 2 for sensing movement of the aircraft 20 and an estimator 5 having a calculator 3 and a memory 4.

Figure 2:
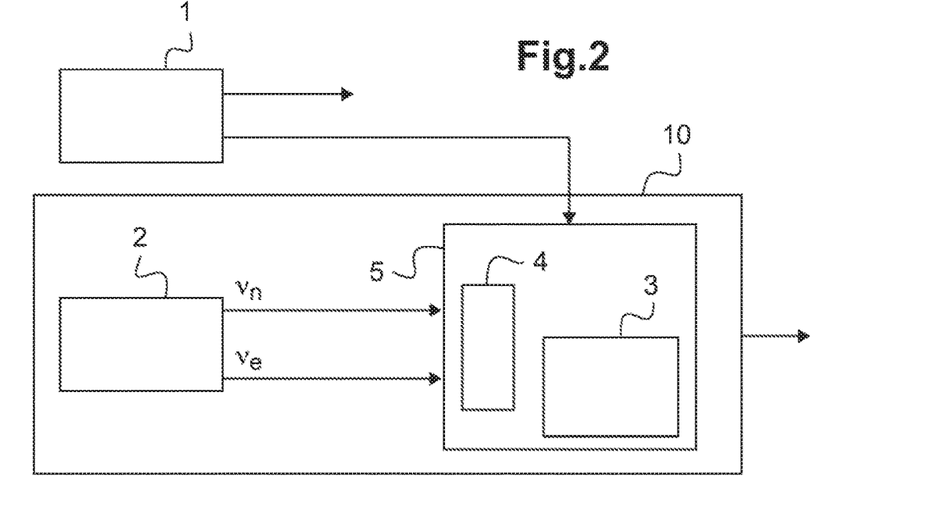
FIG. 2 shows a system for analyzing and monitoring interfering movements of an inertial unit.

The movement sensor 2 is a GNSS receiver and it supplies accurate measurements of movement of the aircraft 20 relative to the ground, which measurements may be velocity or position measurements, these measurements being based by way of example on phase increments of carrier waves of signals transmitted by satellites in at least one GNSS system. The memory 4 stores calculation instructions and possibly thresholds for validating the alignment of the inertial unit 1. The calculator 3 makes use of these calculation instructions, of the movement measurements, and where applicable of the thresholds for validating the alignment of the inertial unit 1 in order to perform a method of analyzing and monitoring interfering movements of the inertial unit 1, as shown in the summary diagram of FIG. 3.

The movement sensor 2 is connected to the estimator 5 in order to supply it with measurements of the movement of the aircraft 20 relative to the ground. The inertial unit 1 is connected to the system 10 in order to supply it with a start signal $t_0$ and an end signal $t_1$ marking the start and the end of the alignment stage.

Figure 3:
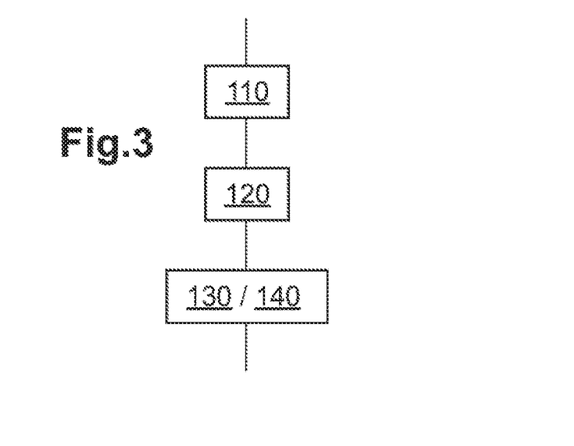
FIG. 3 is a diagram summarizing a method of analyzing and monitoring interfering movements of an inertial unit.

The method of analyzing and monitoring interfering movements of the inertial unit 1 during an alignment stage comprises two steps.

An acquisition step 110 for acquiring measurements of the movement of the aircraft 20 relative to the ground is performed by means of the movement sensor 2 during the stage of aligning the inertial unit 1.

An estimation step 120 of estimating states of a mirror process is also performed from the observations constituted by the movement measurements. The model of the mirror process has a structure that is close to the structure of the model of the alignment process of the inertial unit 1.

The model of the mirror process could equally well be rigorously identical to the model of the alignment process of the inertial unit 1.

During the alignment stage, the alignment process seeks to estimate the vertical direction, by zeroing the two angles of inclination of the inertial unit 1 about North/South and East/West geographical axes, to estimate the direction of North by zeroing the misalignment angle of the inertial unit 1 about the vertical axis, and finally to estimate the components of the velocity of the aircraft 20 relative to the ground. By way of example, the alignment process of an inertial unit 1 is a system having five states, comprising:

i) the three angular differences between the axes of the virtual platform of the inertial unit 1 and the corresponding directions of the local geographical axes; and ii) the two horizontal components of the velocity of the inertial unit 1 relative to the ground.

If the inertial unit 1 is genuinely stationary during the alignment stage, these angular differences and horizontal velocity components converge towards zero values and the inertial unit 1 is then correctly initialized.

Figure 4:
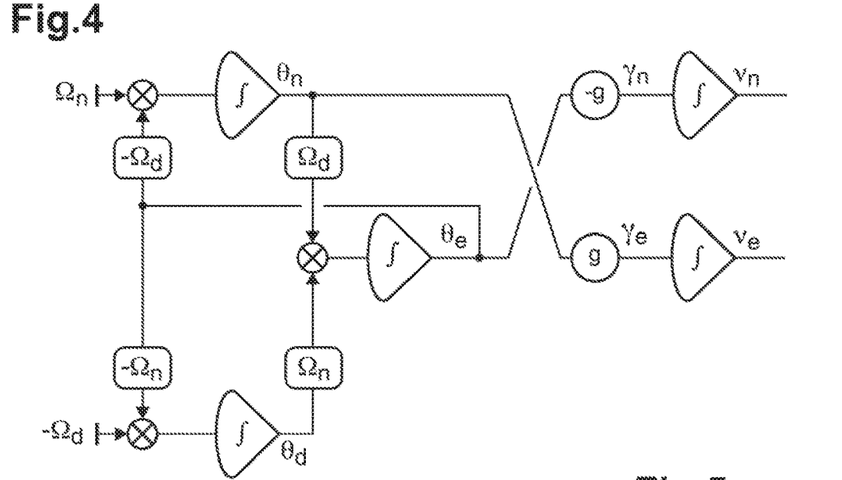
FIG. 4 shows a model of an alignment process of an inertial unit.

A block diagram of an example of a model of the process of aligning the inertial unit 1 is shown in FIG. 4. For this alignment process, $\theta_n$ is the orientation error about the North/South axis, $\theta_e$ is the orientation error about the East/West axis, $\theta_d$ is the orientation error about a vertical axis, $v_n$ is velocity along the North/South axis, and $v_e$ is the velocity along the East/West axis.

This model of the alignment process takes account of the known latitude $\phi$ of the aircraft 20 and uses both the modulus of the acceleration of terrestrial gravity g and a vector representing the angular velocity $\vec{\Omega}_E$ of the earth about its axis. Two projections $\Omega_n$, $\Omega_d$ of this angular velocity vector $\vec{\Omega}_E$, respectively onto the North/South axis and onto the vertical axis and depending on the latitude φ are calculated as follows:

$$\Omega_n = \Omega_E \cdot \cos \phi \text{ and } \Omega_d = \Omega_E \cdot \sin \phi$$

In FIG. 4, the symbol represents an adder and the symbol  represents an integrator. The acceleration errors $\gamma_n$ along the North/South axis and $\gamma_e$ along the East/West axis are also marked.

An estimator of the states of the alignment process may then be a Kalman filter having these five states. In other examples of the alignment process, one or more original states may optionally be used. For example, the latitude φ of the aircraft 20, should it be unknown, may constitute an additional state of the alignment process and may then be determined by the estimator.

The mirror process model used by the method of the invention may be a model that is rigorously identical to the alignment process model shown in FIG. 4. Under such circumstances, both models have the same number of states and the same matrices defining the relationship between those states.

It is also possible for the mirror process model to be simplified or indeed approximated relative to the alignment process model. For example, the 24-hour mode associated with rotation of the earth has specifically been ignored in order to set up the mirror process shown in the form of a block diagram in FIG. 5.

Figure 5:
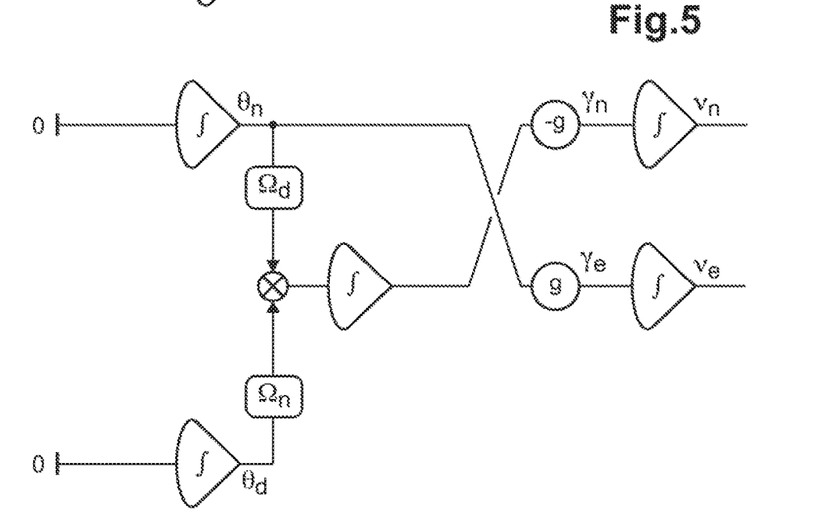
FIG. 5 shows a mirror process.

When operating in an open loop, the model of this FIG. 5 mirror process generates time velocity profiles on its output having the form of two time polynomials:

$$v_e(t) = \theta_{n0} \cdot g \cdot t + V_{e0}$$

and $$v_n(t) = \frac{1}{2} \cdot (\theta_{d0} \cdot \Omega_n + \theta_{n0} \cdot \Omega_d) \cdot g \cdot t^2 + \theta_{e0} \cdot g \cdot t + V_{n0}$$

From these equations, it can be deduced that the movements having an effect on the accuracy of the alignment of the inertial unit 1 are movements consisting in:

i) a speed ramp along the East/West axis, said ramp being defined by the coefficients $\theta_{n0}$ and $V_{e0}$; and ii) a velocity parabola along the North/South axis, said parabola being defined by the coefficients $\theta_{d0}$, $\theta_{n0}$, $\theta_{e0}$, and $V_{n0}$.

Figure 6:
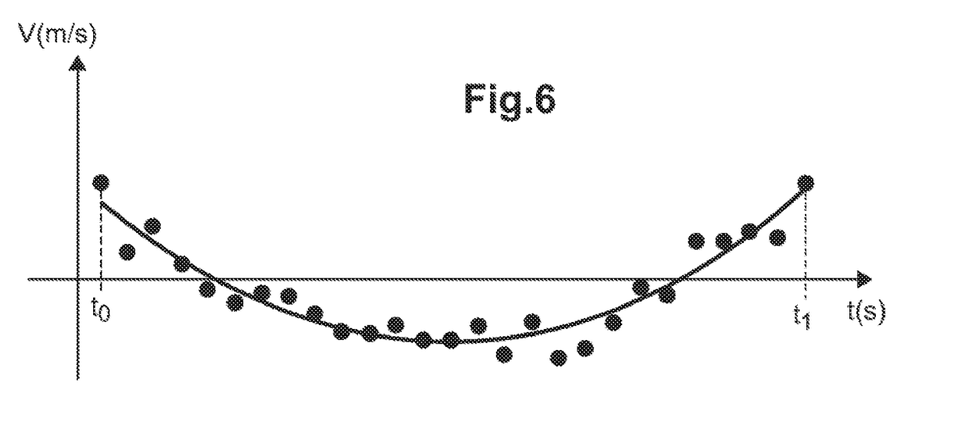
FIG. 6 shows measurements of movement of the aircraft.

By using the movement measurements, which in this example are measurements of the speed of the aircraft 20 relative to the ground during the stage of aligning the inertial unit 1, the method of the invention makes it possible to identify the coefficients of these two polynomial functions. FIG. 6 shows these measurements of the velocity of the aircraft 20 relative to the ground along the North/South axis obtained during the alignment stage, i.e. between the start $t_0$ and the end $t_1$ of the alignment stage, together with a representation of the polynomial function corresponding to this speed along the North/South axis.

The coefficients of these polynomial functions are directly associated with the states of the mirror process. The estimation step 120 of estimating the states of the mirror process consists either in estimating these coefficients for each polynomial function, from which coefficients these states are deduced, or else in estimating the states directly. The states of the mirror process can be estimated from observations constituted by the movement measurements by using known mathematical methods such as the non-recursive least squares method or indeed the recursive least squares method, or else by using a Kalman filter.

The method of the invention may make use during an additional step 130, 140 of these estimated errors for the orientation and the velocities of the inertial unit 1 due to the interfering movements during the alignment stage.

In a first variant of the invention, an additional comparison step 130 of the method comprises comparing the absolute value of at least one estimate of the orientation and velocity errors of the inertial unit 1 with at least one validation threshold, and activating an "alignment invalid" signal if at least one of the thresholds is exceeded.

Activating this "alignment invalid" signal then indicates that the accuracy of the data supplied by the inertial unit 1 is deemed to be insufficient, and that the stage of aligning the inertial unit 1 must be restarted, for example, or that the aircraft must be operated in a mode that does not rely on inertial measurements.

In a second variant of the invention, an additional correction step 140 of the method consists in correcting the data supplied by the inertial unit 1. This correction 140 makes use of the estimated orientation and velocity errors of the inertial unit 1 that results from interfering movements during the alignment stage and that have already been calculated, in order to improve the data supplied by the inertial unit 1 and make that data sufficiently accurate to be usable.

Naturally, the present invention may be subjected to numerous variations as to its implementation. Although several implementations are described, it will readily be understood that it is not conceivable to identify exhaustively all possible implementations.

For example, the movement sensor may be arranged outside the system 10 and may provide its movement measurements to the system 10 so that the system can use them.

Naturally, it is possible to envisage replacing any of the means described by equivalent means without going beyond the ambit of the present invention.

What is claimed is:

1. A method of analyzing and monitoring interfering movements of an inertial unit of an aircraft during a stage of statically aligning the inertial unit, the method being wherein during the stage of statically aligning the inertial unit, the following steps are performed by a processor:
   an acquisition step for acquiring measurements of the movement of the aircraft relative to the ground by a movement sensor;
   an estimation step for estimating states of a mirror process of a model that is simplified and/or approximated relative to the model of the static alignment process of the inertial unit, the states of the mirror process being estimated from observations constituted by the movement measurements; and
   wherein the method includes an additional correction step of correcting data supplied by the inertial unit, the additional correction step using the estimates of the orientation and velocity errors of the inertial unit resulting from interfering movements during the alignment stage in order to make the data supplied by the inertial unit usable.

2. The method according to claim 1, wherein validation thresholds for validating the static alignment are defined prior to the stage of statically aligning the inertial unit, each validation threshold corresponding to a respective one of the estimated states, and the method includes an additional comparison step of comparing the absolute value of at least one estimate of one of the states with at least one validation threshold.

3. The method according to claim 2, wherein during the additional comparison step, the absolute value of at least one estimate of the state is compared with the corresponding validation threshold, and an "alignment invalid" signal is activated whenever the absolute value of an estimate of a state is greater than the corresponding validation threshold.

4. The method according to claim 2, wherein during the additional comparison step, at least two estimates of the states are combined in order to form an estimated state combination, and an "alignment invalid" signal is activated when the estimated state combination is greater than a global threshold.

5. The method according to claim 4, wherein the estimated state combination is equal to a weighted sum of the squares of at least two estimates of the states.

6. The method according to claim 1, wherein during the additional correction step, the correction is calculated from the estimated states, each estimated state being used as an initial value for a process of estimating errors of the inertial unit, the process of estimating errors being maintained throughout the duration of a stage of navigation of the inertial unit following the alignment stage, and the maintained estimate of the errors being subtracted from the data supplied by the inertial unit.

7. The method according to claim 1, wherein during the acquisition step, the measurements of movements of the aircraft relative to the ground are measurements of a velocity ($\vec{v}_g$) of the aircraft relative to the ground.

8. The method according to claim 1, wherein during the acquisition step, the measurements of movement of the aircraft relative to the ground are measurements of a position ($\vec{x}_g$) of the aircraft relative to the ground.

9. The method according to claim 1, wherein the estimation step of states of the mirror process consist in estimating the coefficients of at least one polynomial function of time close to the movement measurements.

10. The method according to claim 9, wherein the movement measurements are measurements of velocity $\vec{v}_g$ relative to the ground, and the model of the mirror process is suitable for generating a second degree polynomial function of time for the North/South component of velocity relative to ground, and a first degree polynomial function of time for the East/West component of velocity relative to the ground.

11. The method according to claim 9, wherein the estimation step of states of the mirror process is performed by the least squares method in which the coefficients for identification are those of the at least one polynomial function of time.

12. The method according to claim 1, wherein the estimation step of states of the mirror process consist in Kalman filtering for which the states are those of the mirror process and for which the observations are the measurements of movement relative to the ground.

13. A system for analyzing and monitoring interfering movements of an inertial unit of an aircraft during a stage of statically aligning the inertial unit, the system comprising:
a movement sensor for sensing movement of the aircraft and supplying measurements of the movement of the aircraft relative to the ground;
an estimator connected to the movement sensor, the estimator capable of estimating a mirror process close to the static alignment process of the inertial unit, the estimator being provided with at least one calculator and with at least one memory storing thresholds for validating the static alignment of the inertial unit and calculation instructions, the estimator serving to estimate states of the mirror process having a model that is close to the model of the static alignment process of the inertial unit, the estimation of the states of the mirror process being performed on the basis of observations constituted by measurements of movement supplied by the movement sensor; and
wherein data supplied by the inertial unit is corrected by using the estimates of the orientation and velocity errors of the inertial unit resulting from interfering movements during the alignment stage in order to make the data supplied by the inertial unit usable.

14. A method of analyzing and monitoring interfering movements of an inertial unit of an aircraft during a stage of statically aligning the inertial unit, the method being wherein during the stage of statically aligning the inertial unit, the following steps are performed by a processor:
an acquisition step for acquiring measurements of the movement of the aircraft relative to the ground; and
an estimation step for estimating states of a mirror process of a model that is simplified and/or approximated relative to the model of the static alignment process of the inertial unit, the states of the mirror process being estimated from observations constituted by the movement measurements by a movement sensor,
wherein validation thresholds for validating the static alignment are defined prior to the stage of statically aligning the inertial unit, each validation threshold corresponding to a respective one of the estimated states, and the method includes an additional comparison step of comparing the absolute value of at least one estimate of one of the states with at least one validation threshold; and
wherein the method includes an additional correction step of correcting data supplied by the inertial unit, the additional correction step using the estimates of the orientation and velocity errors of the inertial unit resulting from interfering movements during the alignment stage in order to make the data supplied by the inertial unit usable.

15. The method according to claim 14, wherein during the additional comparison step:
the absolute value of at least one estimate of the state is compared with the corresponding validation threshold, and an "alignment invalid" signal is activated whenever the absolute value of an estimate of a state is greater than the corresponding validation threshold, or
at least two estimates of the states are combined in order to form an estimated state combination, and an "alignment invalid" signal is activated when the estimated state combination is greater than a global threshold, wherein the estimated state combination is equal to a weighted sum of the squares of at least two estimates of the states.

16. The method according to claim 14, wherein the method includes an additional correction step of correcting data supplied by the inertial unit, the additional correction step using the estimates of the orientation and velocity errors of the inertial unit resulting from interfering movements during the alignment stage in order to make the data supplied by the inertial unit usable and wherein during the additional correction step, the correction is calculated from the estimated states, each estimated state being used as an initial value for a process of estimating errors of the inertial unit, the process of estimating errors being maintained throughout the duration of a stage of navigation of the inertial unit following the alignment stage, and the maintained estimate of the errors being subtracted from the data supplied by the inertial unit.

17. The method according to claim 14, wherein during the acquisition step, the measurements of movements of the aircraft relative to the ground are measurements of a velocity of the aircraft relative to the ground.

18. The method according to claim 14, wherein during the acquisition step, the measurements of movement of the aircraft relative to the ground are measurements of a position of the aircraft relative to the ground.

19. The method according to claim 14, wherein the estimation step of states of the mirror process consist in estimating the coefficients of at least one polynomial function of time close to the movement measurements and wherein the movement measurements are measurements of velocity relative to the ground, and the model of the mirror process is suitable for generating a second degree polynomial function of time for the North/South component of velocity relative to ground, and a first degree polynomial function of time for the East/West component of velocity relative to the ground.

* * * * *